J. J. HOPPES.
DEVICE FOR MEASURING THE FLOW OF LIQUIDS.
APPLICATION FILED JAN. 9, 1913.
1,215,533.
Patented Feb. 13, 1917.
5 SHEETS—SHEET 3.
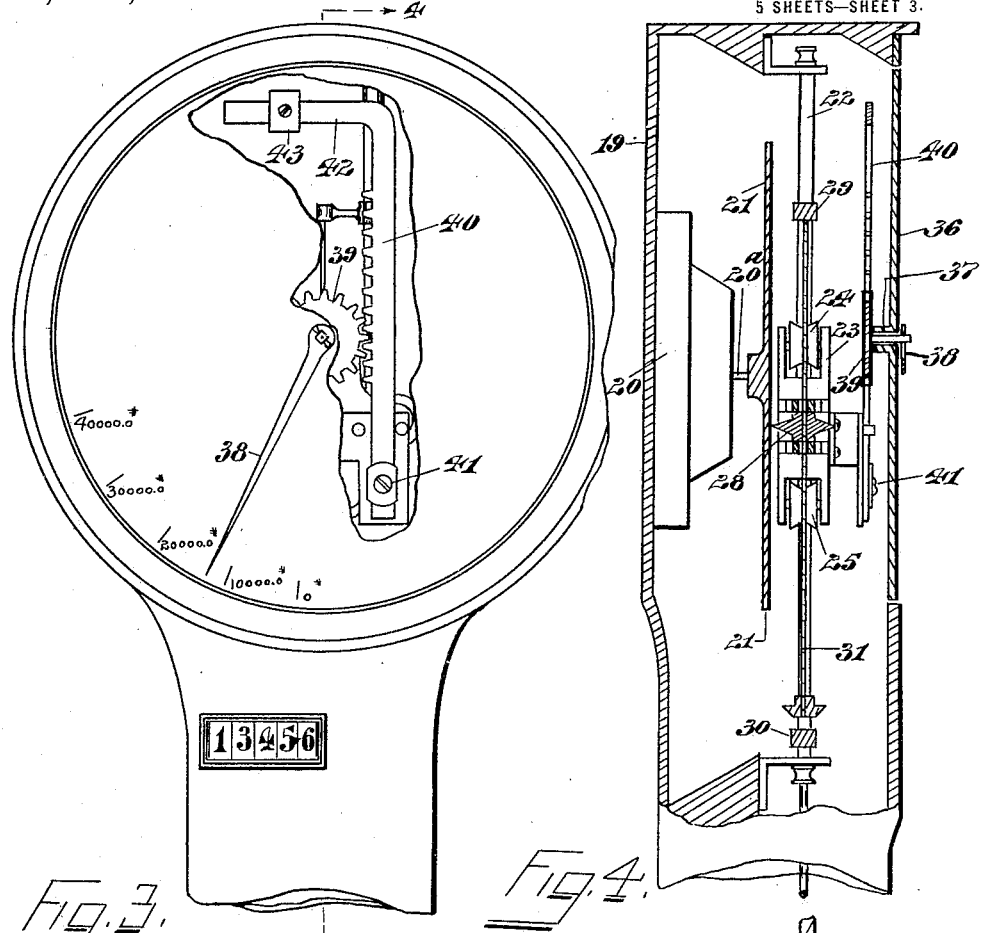
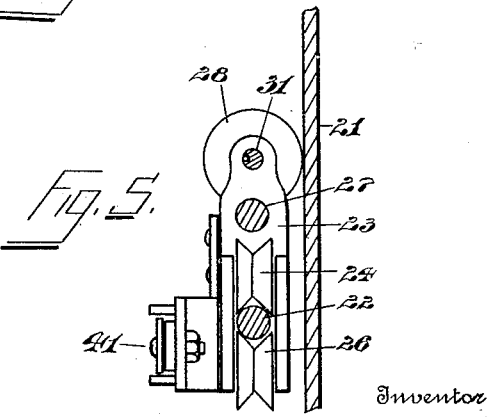
Witnesses
Inventor
John J. Hoppes
By Staley & Bowman
Attorneys

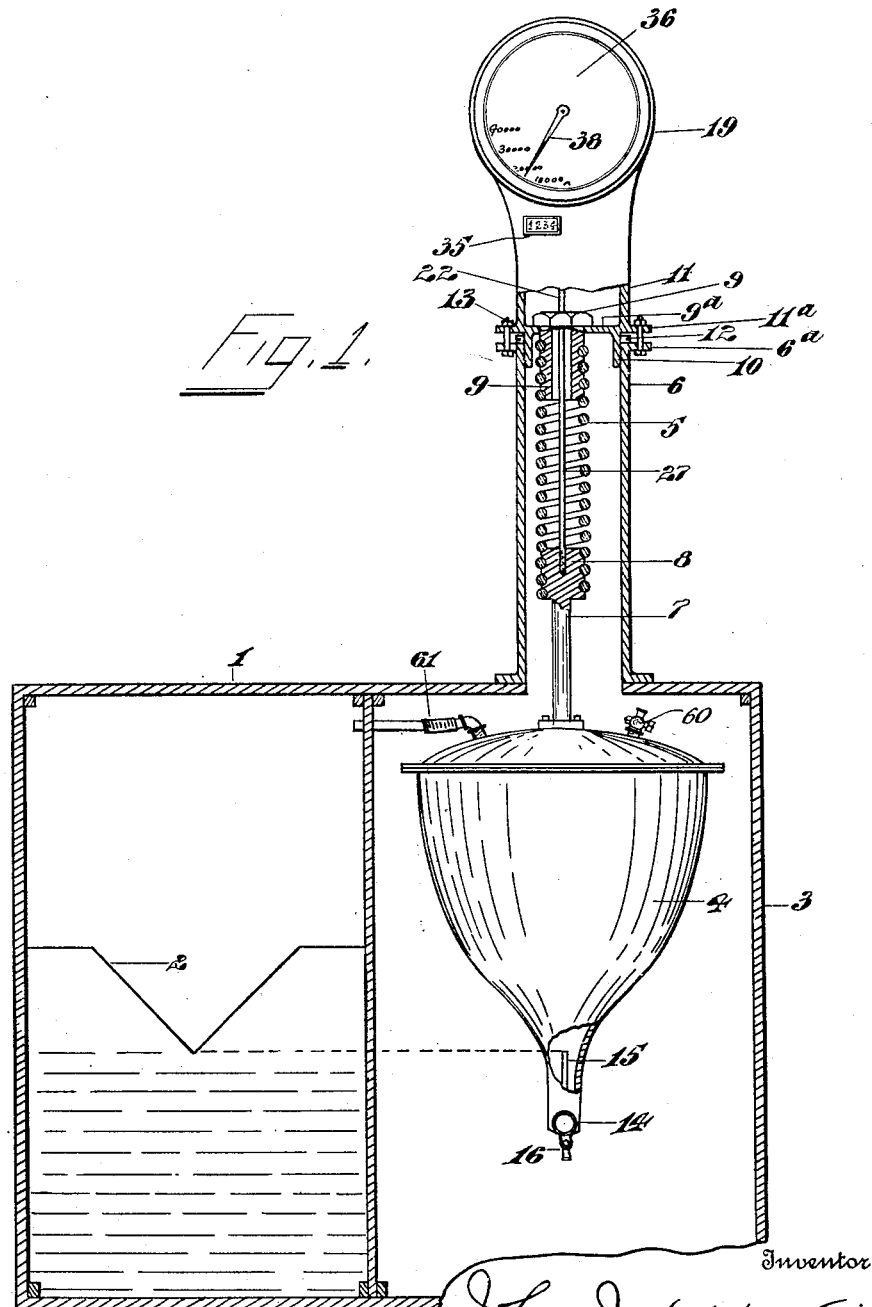

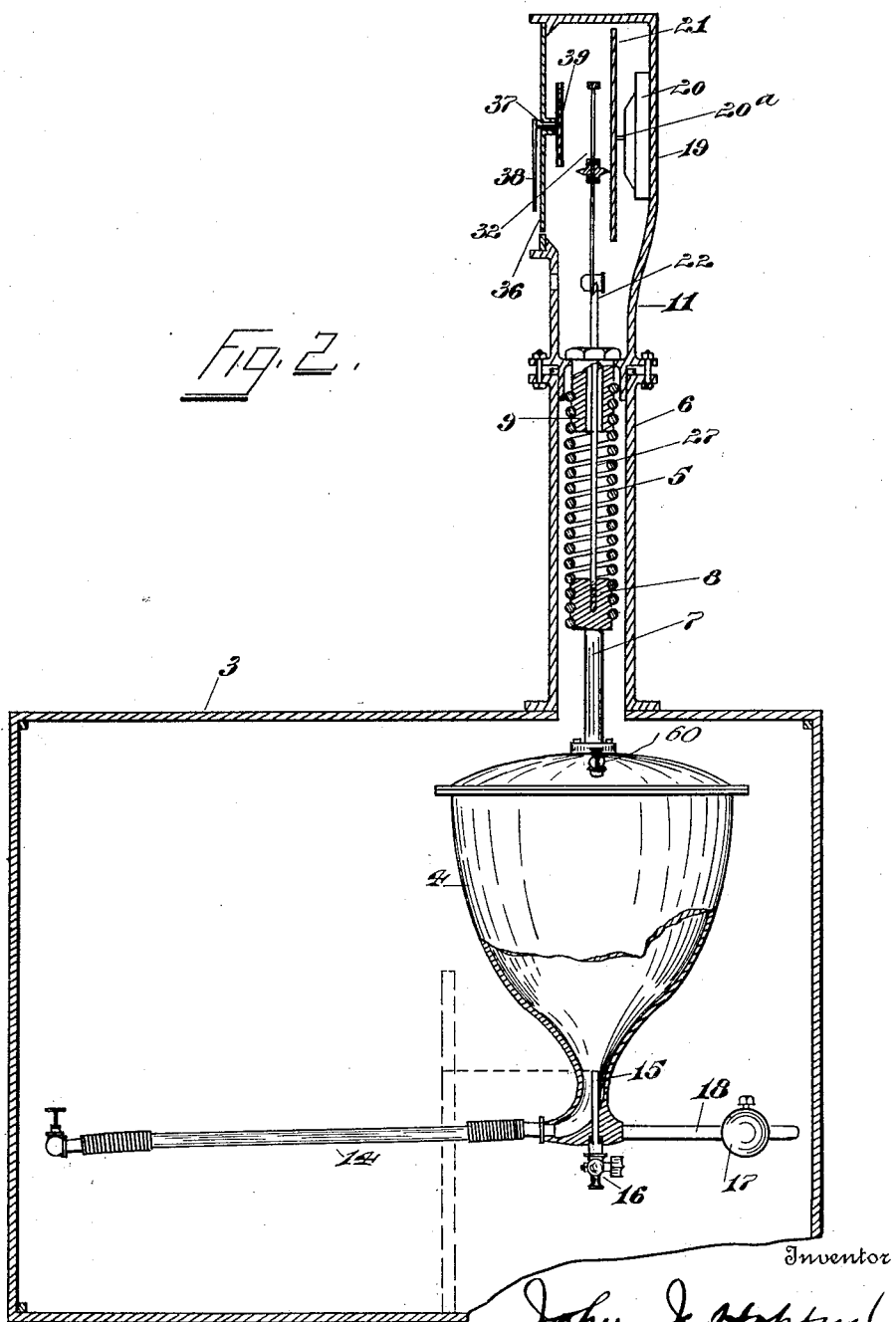

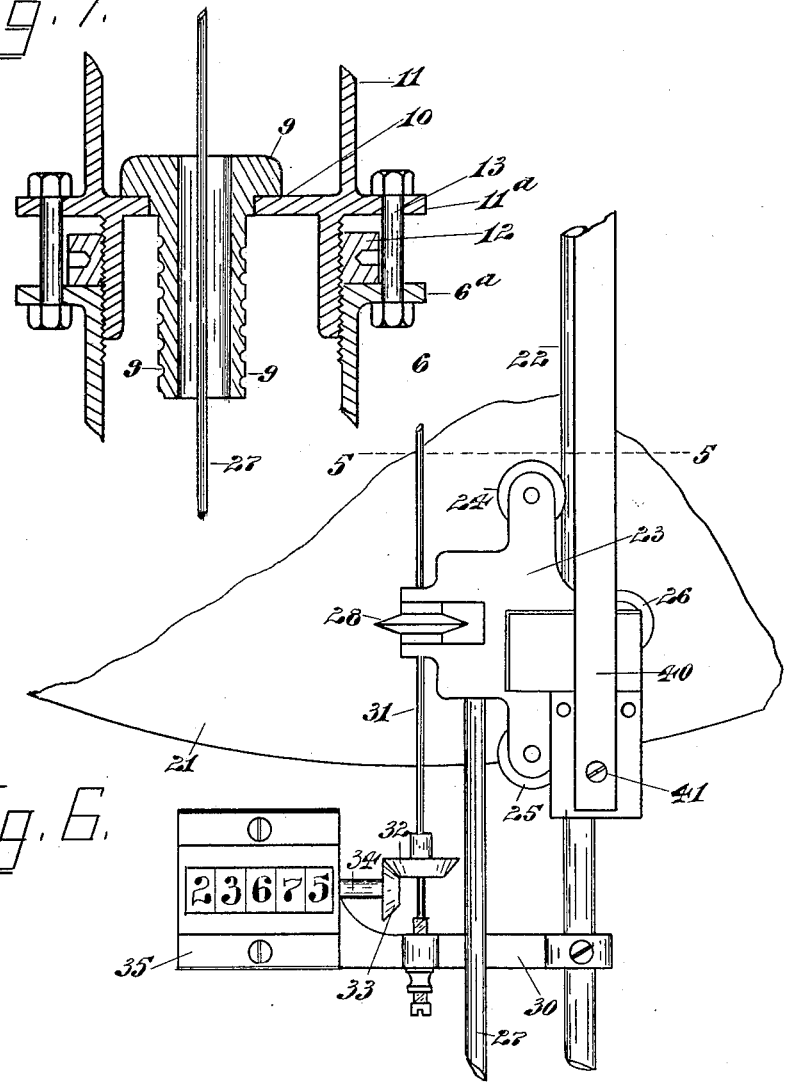

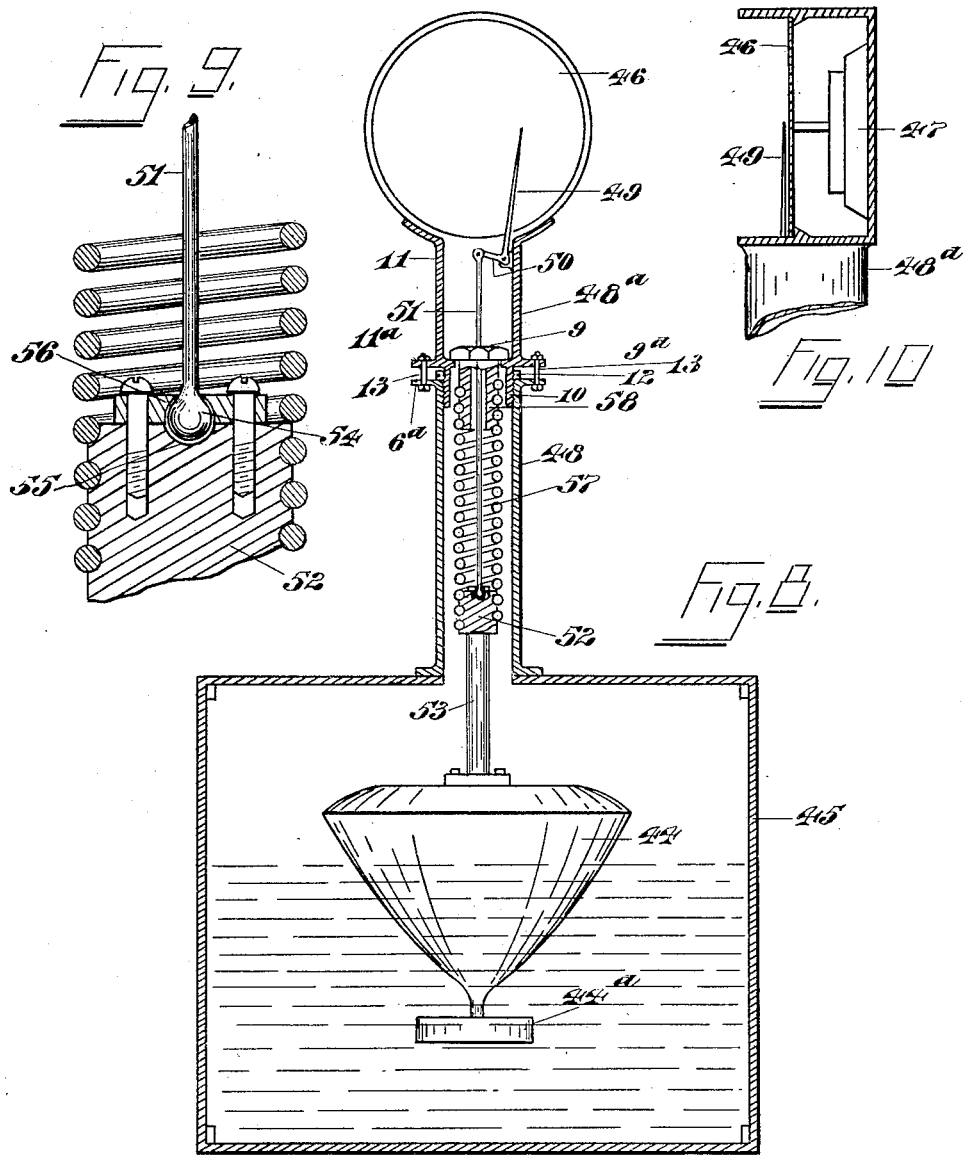

UNITED STATES PATENT OFFICE.

JOHN J. HOPPES, OF SPRINGFIELD, OHIO, ASSIGNOR TO THE HOPPES MANUFACTURING COMPANY, OF SPRINGFIELD, OHIO, A CORPORATION OF OHIO.

DEVICE FOR MEASURING THE FLOW OF LIQUIDS.

1,215,533.

Specification of Letters Patent.

Patented Feb. 13, 1917.

Application filed January 9, 1913. Serial No. 741,077.

*To all whom it may concern:*

Be it known that I, JOHN J. HOPPES, a citizen of the United States, residing at Springfield, in the county of Clark and State of Ohio, have invented certain new and useful Improvements in Devices for Measuring the Flow of Liquids, of which the following is a specification.

This invention relates to improvements in devices for indicating and recording the flow of liquids over a weir or through an orifice, particularly where the head of the liquid is variable.

An object of this invention is to provide a device of the character referred to which will be simple and effective in its operation and in which friction will be eliminated to a degree not heretofore attained in mechanism of this nature.

A further and more particular object of the invention is to provide means whereby the indicating and recording mechanism will be operated directly from a liquid-actuated member, constructed and arranged in such a manner that its movement will be directly proportionate to the flow of the liquid, so that the employment of such frictional motion-rectifying devices as cams and helices is obviated.

A further object of the invention is to provide simple and effective indicating and recording mechanism in connection with the liquid-actuated devices to indicate and record the flow of the liquid in an accurate manner.

A further object of the invention is to improve generally and make more effective the operation of devices of this character.

In the accompanying drawings,—

Figure 1 is a partial vertical sectional view of an apparatus embodying the improvements.

Fig. 2 is a longitudinal section of the same.

Fig. 3 is an enlarged front elevation of a portion of the indicating and recording devices, a part of the same being broken away to better illustrate some of the parts.

Fig. 4 is a vertical section of the same on the line 4—4 of Fig. 3.

Fig. 5 is a transverse section on the line 5—5 of Fig. 6.

Fig. 6 is a front elevation of a portion of the recording mechanism.

Fig. 7 is an enlarged detail of a part of the devices shown in Fig. 1.

Fig. 8 is a vertical section showing a modification.

Figs. 9 and 10 are details of the same.

Like parts are represented by similar characters of reference throughout the several views.

In the accompanying drawings, 1 represents a box of any suitable construction in which may be located a weir or orifice of any suitable form, a V-shaped orifice, 2, being shown in the present case for the purpose of illustration. Located preferably in a suitable compartment, 3, adjacent the weir box, 1, is a water container, 4, of peculiar construction, as will be explained more fully hereinafter. This container is suspended from a spring, 5, hung from a supporting standard 6, extending upwardly from the compartment, 3; the said container being provided with an upwardly projecting stem, 7, having a screw-threaded head, 8, screwed into the lower end of the spring, the upper end of the spring being screwed to a screw-threaded head, 9, which is supported through the medium of the flange, $9^a$, and web, 10, of the standard, 11. The standards 6 and 11 are provided with screw-threaded parts so that they may be adjustably secured together, a lock-nut 12 being provided to secure them in their adjusted position, and a series of bolts, 13, extending through projecting flanges, $6^a$ and $11^a$, being further provided for securely holding the parts together.

The container 4 is connected with the water compartment by a suitable flexible connection, 14, so that the liquid in the weir box will find its level in the container. This container is constructed of a gradually increasing capacity, proportioned to correspond with the amount of liquid required at any height therein to cause the container to descend the proper distance to indicate or record on suitable uniformly-operating mechanism the rate of flow at any position in the travel thereof; the exact form of this container being ascertained from formulas derived by mathematical calculations in a manner familiar to engineers skilled in this class of devices. As an example, I give the following formula for a container suitable for use in connection with a 90 degree V- notch sharp-edged weir, when said container is supported by a spring, to wit:

Prof. James Thomson has expressed the rate of flow through the 90°-V-notch-sharp edged weir by the formula Cubic feet per minute $= 0.305 H^2 \sqrt{H}$, where $H =$ height of notch in inches, the angle being 90°.

$$\text{Weir height } H = (Q/K)^{2/5} = \frac{Q^{2/5}}{(0.305 \times 60 \times 62.5 \times f)^{2/5}}$$

where $f =$ relative density at temperature T°.

With a suitable weighing vessel supported by a heavy spring and connected to the weir tank by a flexible tubulature attached to the bottom of the vessel and so adjusted that the water stands at the zero point in the vessel when the scale registers zero and the water in the weir tank is also at the zero position in the bottom of the V-notch, then for any rate of flow as Q lbs. per hr. there corresponds a weir height $$H = k Q^{2/5}, \quad k = \frac{1}{K^{2/5}},$$

and the water rising to the same level in the weighing vessel as in the weir tank, causes a depression of this vessel proportional to the weight of its water content, and which weight is planned to be proportional to the rate of discharge Q through the weir. Thus a vessel of definite form and size is requisite. A series of radii of mean sections is then determined to meet the requirement as follows:—

Let $h =$ No. inches increase in height of liquid (90°-V-notch) above any ht. H.

$q =$ corresponding increase in discharge rate of weir above that of Q.

$w =$ weight of 1 cu. in. of water at temperature T°.

$s =$ spring constant, i. e., the No. lbs. wt. needed to give 1″ elongation of the spring.

$e =$ elongation of spring, proportional to $q$, but due to increase in water content.

$E =$ total elongation of spring from zero, proportional to (Q max.) $=$ the maximum discharge rate of weir.

$d =$ increase in depth of water in vessel $= (h+e)$.

$r =$ radius of mean section of volume increase, meaning by volume increase the volume of vessel increase for each unit of height thereof.

Then the following relations hold:

$$d = h + e, \quad e = \frac{qE}{(Q \max.)}$$

So also we may express the lbs. flow per hour, $$Q = K \cdot H^{5/2},$$

where $K =$ a constant, involving the transformation factors of the units, the density of water at the temperature of measurement and the constant of Thomson's formula. Also if the weir heights corresponding to assumed rates of flow are wanted and weight of water causing elongation $(e)$ is $= \pi r^2 dw$ and also is $= es$; hence $$r^2 = \frac{es}{\pi dw}$$

and $$r = \sqrt{\left(\frac{es}{\pi dw}\right)} = \sqrt{\left(\frac{Esq}{\pi Q_{max} wd}\right)} = c\sqrt{(q/d)},$$

where $$c = \text{const. } i. e., c = \sqrt{\left(\frac{Es}{\pi w Q_{max}}\right)}.$$

For any liquid ht. H, total depth in vessel, $D = (H+E)$ and $$D + \frac{d}{2}$$

gives height of radius $r$ above zero point of vessel.

In installing the apparatus, the container is so adjusted by means of the adjusting devices previously described that the lowest point thereof where the capacity begins to vary will be exactly in line with the lowest point of the orifice, where an orifice is used, or with the top of the sill or weir, where such is used. This is preferably accomplished by providing a small standpipe, 15, in the inlet opening thereof having a valve, 16, at its lower end and with its upper end arranged at the point where the capacity of the container begins to vary or increase, so that by properly adjusting the height of the container until the water begins to trickle through the valve, the apparatus may be nicely adjusted to the proper point. A weight, 17, adjustably mounted upon an arm, 18, projecting from the lower end of the container opposite the flexible connection, 14, is provided to counter-balance the weight of the connection, 14, and bring the container to a vertical position.

Located at the upper end of the standard 11 is a casing, 19, which contains mechanism for indicating the rate of flow and also for recording the total flow of the water. Secured to the rear wall of this casing, 19, is a suitable clock mechanism, 20, the main arbor, 20ª, of which carries a disk, 21; said disk 21 being revolved by said clock mechanism at a uniform speed. In front of the disk 21 is a vertically-arranged stationary rod, 22, upon which is slidably mounted a carriage, said carriage consisting of a suitable frame, 23, within which is located a series of guide rollers 24, 25 and 26, adapted to embrace the rod 22, so that said carriage will move freely up and down said rod in a manner to be described. This carriage is connected with the liquid container 4 by a rod, 27, said rod 27 being secured to the head 8, passed through an aperture in the head 9 and secured to a suitable point of the frame 23 of the carriage. Rotatably mounted in the frame 23 of said carriage is a roller, 28, said roller 28 being in frictional engagement with the disk 21 so as to be revolved thereby. Revolubly mounted in suitable bearings carried by the arms, 29, and 30, projecting from the stationary guide-rod 22 is a shaft, 31, said shaft extending through the hub of the roller 28 and being splined thereto so as to revolve therewith. The lower end of the shaft carries a beveled gear, 32, in mesh with the beveled pinion, 33, of the main shaft, 34, of a suitable counting mechanism, 35, supported from the lower arm 30. In the normal position of the devices, that is, before any of the liquid has entered the container, the carriage 23 will be so positioned on the guide-rod 22 as to bring the roller 28 to the center of the revolving disk 21, where it will remain stationary. As the water rises in the container and causes the same to descend, it will be seen that the wheel 28 will be moved away from the center of the disk and thereby caused to revolve with a gradually increased speed, and, vice versa, as the water falls in the container and the latter rises under the influence of the spring 5, the wheel 28, approaching the center of the revolving disk, revolves at a lesser speed; the movement of said wheel being transmitted to the adding mechanism 35 to cause the total amount of the water to be registered or recorded thereby.

Located in the front of the casing 19 is a stationary dial, 36, and centrally mounted in this dial is an arbor, 37, provided at its outer end with an indicating hand, 38, and at its inner end with a pinion, 39. Secured to the carriage 23 is a vertically-arranged rack, 40, in mesh with the pinion 39; the connection of said rack with said carriage being a pivotal one, as at 41, and said rack being provided at its upper end with a laterally extending portion, 42, having thereon a weight 43, so that said rack will be held yieldingly in mesh with the pinion to permit ready dismantling of the parts and to obviate any undue friction. As the carriage moves up and down, due to the varying weight of the water in the container, as before described, it will be seen that by the construction described, the indicating hand will be moved about the dial, which will be suitably graduated so that the rate of flow will be indicated thereby.

By this construction, it will be seen that I have devised an apparatus for determining the flow of liquid, in which the liquid acts directly upon the mechanism for indicating and recording the flow of the same and that the necessity for providing intervening motion-rectifying devices such as cams, helices, or the like, is obviated, thus eliminating the friction occasioned by the use of such devices and making the apparatus more sensitive and consequently accurate in its operation, and also less expensive to construct.

In Figs. 8, 9 and 10, is shown a modification of the device. In this modification, the water-actuated member is in the form of a float, 44, located in a water compartment, 45, connected with the weir-box and in which the water is maintained at the same level as that in the weir-box. This float is formed of gradually increasing diameter from the bottom upwardly, so that as the water rises or falls, more or less of an area of the float will be acted upon by said water; the float being loaded by a weight, 44$^a$, in excess of its buoyancy. The contour and form of said float is such that it will be influenced by the rising and falling of the water in exact proportion to the rate of flow in the manner described in connection with the water container. In the present case, the indicating device is in the nature of a dial or chart, 46, uniformly revolved by a suitable clock mechanism, 47. A bell crank lever is pivotally connected to the standard, 48$^a$, so that the long arm, 49, will lie in proximity to the face of the chart and carry a pen or pencil. The short arm, 50, of this bell crank lever is connected to the float through the medium of a rod, 51, pivotally connected at its upper end to the arm 50 and also pivotally connected at its lower end to the head, 52, of the stem, 53, which is secured directly to the float. The connection of the rod, 51, with the head 52, is such as to permit said rod to vary from a vertical direction without influencing the float, this being accomplished preferably by providing the lower end of the rod with a ball, 54, seated in a recess, 55, in the head and held therein by a collar, 56, secured to the head 52. A spring, 57, screwed to a stationary head, 52, at its lower end and also screwed to a stationary head, 58, at its upper end, serves to support the float in a manner to permit it to move under the action of the water; the movement of the float as the water rises serving to unload the spring which has been expanded by the weight of the float 44 and weight 44$^a$, to permit the submerging of the float to the proper depth. The supporting standard, 48 and 48$^a$, is formed in two parts adjustably connected together in the same way as described in connection with the water container so that the position of the float may be adjusted so as to bring the lowermost point thereof on a line with the bottom of the weir before the flow of the liquid has begun.

As shown in Figs. 1 and 2, the upper part of the container 4 is provided with a vent, 60, to permit of the escape of the air therefrom as the water rises therein. In cases where a closed weir-box is employed, the upper part of the container will also be provided with a flexible connection, 61, leading to the weir-box above the highest water line therein, in order that, if the pressure in the weir-box should rise above the pressure of the atmosphere, an equilibrium between the weir-box and container will be maintained. When the flexible connection 61 is employed, the air vent 60 may be dispensed with entirely, or may be provided with a valve, so that it may be closed to the atmosphere.

Having thus described my invention, I claim:—

1. In a device for measuring the flow of liquid, a weir over which the liquid is adapted to flow at varying heights, a movable liquid-actuated member, a liquid communication between said member and the liquid whereby said member may be acted upon directly by said liquid, said member being so formed as to be moved by said liquid proportionately to the rate of flow, and devices connected with said liquid-actuated member by which the flow of said liquid may be determined.

2. In a device for measuring the flow of liquid, a weir over which the liquid is adapted to flow at varying heights, a movable liquid-receiving member arranged to be operated upon by the liquid, said member being so formed as to be moved by said liquid proportionately to the rate of flow, and devices connected with said liquid-actuated member by which the flow of said liquid may be determined.

3. In a device for measuring the flow of liquid, a weir over which the liquid is adapted to flow at varying heights, a movable liquid-actuated member arranged to be operated upon by the liquid, a yieldable support for said member, said member being so formed as to be moved by said liquid proportionately to the rate of flow, and devices connected with said liquid-actuated member by which the flow of said liquid may be determined.

4. In a device for measuring the flow of liquid, a weir over which the liquid is adapted to flow at varying heights, a movable liquid-actuated member arranged to be operated upon by the liquid, means connected with said member for resisting the movement thereof, said member being so formed as to be moved by said liquid proportionately to the rate of flow, and devices connected with said member by which the flow of said liquid may be determined.

5. In a device for measuring the flow of liquid, a weir over which the liquid is adapted to flow at varying heights, a movable liquid-actuated container, a liquid communication between the liquid and the interior of said container, said container being so formed as to be moved by said liquid proportionately to the rate of flow thereof, and devices connected with said container by which the flow of said liquid may be determined.

6. In a device for measuring the flow of liquid, a weir over which the liquid is adapted to flow at varying heights, a movable liquid-actuated container, a liquid communication between the liquid and the interior of said container, means connected with said container for resisting the movement thereof, said container being so formed as to be moved by said liquid proportionately to the rate of flow, and devices connected with said container by which the flow of said liquid may be determined.

7. In a device for measuring the flow of liquid, a movable liquid container within which the liquid is adapted to maintain its level, said container being so formed as to receive a weight of the liquid therein proportionate to the rate of flow thereof, and devices connected with said liquid container by which the flow of said liquid may be determined.

8. In a device for measuring the flow of liquid, a movable liquid container within which said liquid is adapted to maintain its level, means for resisting the movement of said container, said container being so formed as to receive a weight of the liquid therein proportionate to the rate of flow thereof, and devices connected with said container by which the flow of said liquid may be determined.

9. In a device for measuring the flow of liquid, a movable liquid container having a communication with the liquid and within which said liquid is adapted to maintain its level, a spring for supporting said container, said container being so formed as to receive a weight of the liquid therein whereby it is moved against the tension of the spring proportionately to the rate of flow thereof, and devices connected with said liquid container by which the flow of said liquid may be determined.

10. In a device for measuring the flow of liquid, a liquid container having a communication with the liquid and within which said liquid is adapted to maintain its level, means for supporting said container in a manner to permit it to receive a weight of the liquid therein, means for adjusting the position of said container to correspond to the height of said liquid, said container being so formed as to be moved by the weight of the liquid therein proportionate to the rate of flow thereof, and devices connected with said container by which the flow of said liquid may be determined.

11. In a device for measuring the flow of liquid, a weir-box, a movable liquid container, a connection between said container and box whereby the liquid in said box may flow into said container, said container being so formed as to receive a weight of the liquid therein proportionate to the rate of flow thereof, the upper part of said container having an air vent, and devices connected with said container by which the flow of said liquid may be determined.

12. In a device for measuring the flow of liquid, a weir having an orifice through which the liquid flows at varying heights, a movable liquid-actuated container formed to receive a weight of liquid therein proportionate to the rate of flow thereof, a liquid communication between the liquid and the interior of said container, said container having a discharge valve-controlled passageway leading from the lowest point where the capacity of the container begins to vary, and means for adjusting the height of said container.

13. In a device for measuring the flow of liquid, a weir having an orifice through which the liquid flows at varying heights, a movable liquid-actuated container formed to receive a weight of liquid therein proportionate to the rate of flow thereof, a liquid communication between the liquid and the interior of said container, a valve controlled stand-pipe arranged in the bottom of said container with its upper end at the point where the capacity of the container begins to vary and means for adjusting the height of said container.

In testimony whereof, I have hereunto set my hand this 4th day of January, 1913.

JOHN J. HOPPES.

Witnesses:
 CHAS. I. WELCH,
 ESTHER E. PFEIFER.

Copies of this patent may be obtained for five cents each, by addressing the "Commissioner of Patents, Washington, D. C."